Sept. 15, 1942.                J. C. MILLER                2,296,219
                          SNAP ACTION FLOAT VALVE
                          Filed March 27, 1941
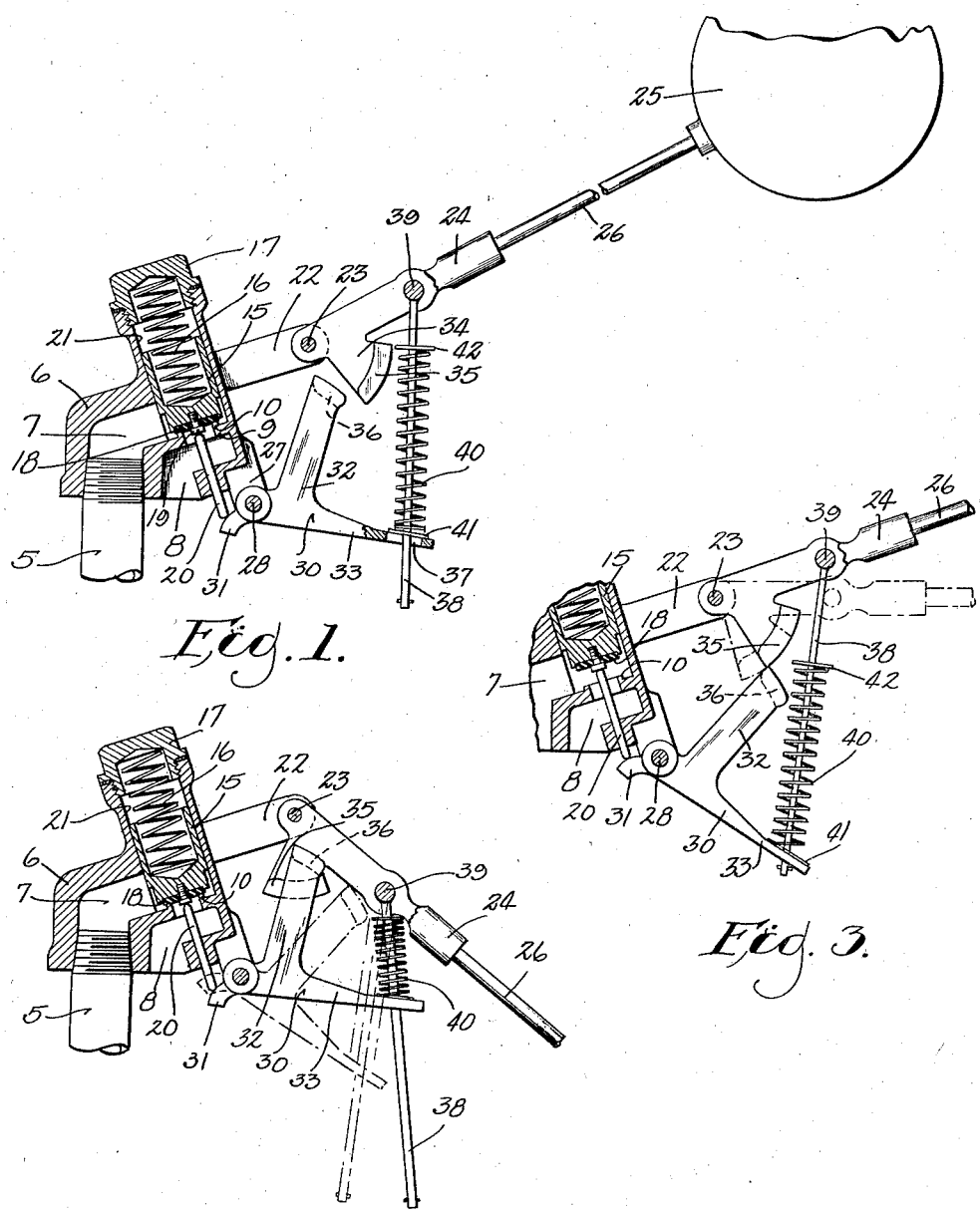
INVENTOR
JACOB C. MILLER
BY
Wheeler, Wheeler & Wheeler Patented Sept. 15, 1942

2,296,219

UNITED STATES PATENT OFFICE 2,296,219

SNAP ACTION FLOAT VALVE

Jacob C. Miller, Milwaukee, Wis., assignor to Badger Meter Manufacturing Company, Milwaukee, Wis., a corporation of Wisconsin Application March 27, 1941, Serial No. 385,442

11 Claims. (Cl. 137—104)

This invention relates to improvements in snap action float valves.

It is the primary purpose of the invention to provide a novel and improved snap action float valve structure in which the snap action is provided by means more dependable than the conventional toggle joint arrangement.

It is a further object of the invention to provide an extremely simple snap action valve mechanism employing few and inexpensive parts and using only a single lever and a single spring other than that provided for the valve itself to afford the desired snap action movement between the float arm and the valve.

A further object is generally to simplify and improve the construction, arrangement and operation for one or more of the purposes mentioned, and still other objects will be apparent from the specification.

In the drawing:

Fig. 1 is a view partially in side elevation and partially in section, of a snap action float valve embodying the invention as it appears with the valve closed.

Fig. 2 is a view similar to Fig. 1 showing the parts in the positions they occupy when the valve is about to open, the open position of the parts being illustrated in broken lines.

Fig. 3 is a fragmentary detail view similar to Fig. 1, showing the parts in the positions they occupy when the valve is about to close.

Like parts are identified by the same reference characters throughout the several views.

One of the advantages of the device herein disclosed is that it may be used in any situations from the smallest tanks to the largest, being adapted to control the water supply to a toilet flush tank or to a large storage tank. The entire apparatus is conveniently mounted on the water supply pipe 5.

The valve casing 6 threaded to the water supply pipe 5 has an inlet passage 7 and an outlet passage 8 between which there is a ported web 9 providing a valve seat at 10.

The valve 15 is preferably recessed to receive the conventional compression spring 16 which is confined by the removable closure 17 for the upper end of the casing. At its lower end the valve 15 preferably has a removable gasket 18 held by a screw 19 against which bears a push rod 20 by means of which opening pressure is transmitted to the valve through the port against the compression of spring 16 and the water pressure communicated through pipe 5.

A feature of the valve is the inclined axis of the cylinder 21 in which the valve 15 is reciprocable. The inclination greatly facilitates the economical construction of the parts.

One or more arms 22 project from the valve casing 6 carrying pintle 23 upon which is pivoted the float lever 24, at the end of which float 25 is mounted in the usual manner, preferably being carried by the extension rod 26.

One or more downwardly projecting ears 27 provide a pintle at 28 for the bell crank lever 30 which has an end portion 31 engaged with the push rod 20 to operate the valve, and has an upwardly extending arm at 32 and a laterally extending arm at 33.

The float lever 24 is also, in effect, a bell crank, having a depending arm at 34. Arm 34 has an arcuately formed cam at 35 which projects toward the observer as viewed in the drawings, while arm 32 has on its rear side a complementary cam lug 36 projecting away from the observer as viewed in the drawings. The cam 35 and cam lug 36 are disposed in the same vertical plane for interaction in the manner hereinafter to be described.

The arm 33 of bell crank 30 is apertured at 37 to receive a guide pin 38 pivotally connected at 39 to the float lever 24. Loosely mounted on this guide pin is a compression spring 40 having washers 41 and 42 at its lower and upper ends for engagement by the arm 33 and the float lever 24 respectively. The spring is sufficiently shorter than the clearance between the float lever and the arm 33 in the raised position of the float lever as to afford considerable lost motion without spring operation.

The device functions as follows: Inserted in a suitable tank such as a toilet flush tank or a larger reservoir, the device will, when the tank is full, appear as shown in Fig. 1, the float being elevated and the valve 15 closed.

As water is withdrawn from the tank the float will move down, oscillating the lever 24 upon its fulcrum 23.

As the downward movement continues, the cam flange 35, which is drawn arcuately about fulcrum 23, will engage beneath a cam flange 36 on bell crank lever 30, thereby holding bell crank lever 30 stationary against oscillation in a valve opening direction.

The continued downward movement of the float and the float lever 24 will compress spring 40 until finally, as the float lever 24 approaches its extreme lowermost position, the compression spring 40 will be materially compressed as shown in Fig. 2 and the cam flange 35 will reach a point where it is about to pass from beneath the cam flange 36.

During all of this time the inter-engagement of the cam flanges 35 and 36 has held the bell crank lever 30 stationary and allowed the valve to remain closed. However, as soon as cam flange 35 passes from beneath flange 36, the energy stored in the spring 40 is exerted through the bell crank lever 30 to oscillate such lever to the position shown in dotted lines in Fig. 2, thereby transmitting thrust through pin 20 to force valve 15 open against the compression of spring 16. Obviously, the compression of spring 40 must exceed that exerted by spring 16 in order that the valve may be opened.

The water admitted through the valve discharge passage 8 by the opening of valve 15, will gradually refill the tank in which the valve is used, thereby causing the float to rise. As the float rises, the compression of the float and float lever upon spring 40 is relieved, thereby permitting such spring to expand to the point where its compression would be inadequate to counteract that of the valve spring 16. The valve spring 16, however, is prevented from closing the valve by further interaction between the cam flange 35 and the cam flange 36. This time the float lever 24 is moving upwardly in a counter-clockwise direction about its fulcrum 23, and the under surface of cam flange 35 moves above the end of cam flange 36 as shown in dotted lines in Fig. 3.

Thus, despite the fact that the spring 40 has expanded, the valve is still held in its full open position by cam flange 35 until the continued movement of the float and the float lever 24 brings the cam flange 35 to the position shown in full lines in Fig. 3. At this point cam flange 35 is about to clear cam flange 36.

As soon as clearance is effected, the full compression of the valve spring 16 is suddenly exerted on the valve, supplementing the water pressure itself, and the valve snaps shut. The parts are now in the position shown in Fig. 1, ready for a repetition of the cycle of operations as described.

While a variety of arrangements embodying the invention will readily suggest itself to those skilled in the art, it is believed that the device disclosed is one of the simplest and least expensive and most compact arrangements possible. Any such device is highly reliable in operation and very accurate to effect opening and closing valve movements at extremely specific points in the movement of the float.

I claim:

1. A snap action valve mechanism comprising the combination with driving and driven levers, of a lost motion connection between the levers including an energy storing spring, arms connected to the respective levers and movable in intersecting arcs, and cam means carried by said arms and engageable to preclude the driven lever from movement until the driving lever has moved through a predetermined arc.

2. In a snap action valve mechanism, the combination with a ported valve casing and a valve mounted therein and biased for closing movement, of a valve lever provided with a connection for opening said valve in opposition to said bias, an operating lever having a portion movable toward said valve actuating lever, a compression spring interposed between said levers and having sufficient bias when compressed by said levers to overcome the closing bias of said valve, said spring being normally relieved of compression in an extreme position of said operating lever, cam parts connected with the respective levers and engageable in opposite relative directions of movement of the respective levers, said cam parts being engageable in the approach of the operating lever to the valve actuating lever to preclude movement of the valve actuating lever until the operating lever reaches a predetermined position in which said spring has sufficient compression to unseat the valve and said cam parts being engageable in the reverse direction of movement of the operating lever to preclude movement of the valve actuating lever in a valve seating direction until the bias of said spring is lower than the closing bias to which the valve is subject, whereby said valve will be snapped to its seat when said cam means clear each other.

3. In a snap action valve mechanism, the combination with a valve casing provided with a seat and a valve movable to and from the seat, of a spring biasing the valve to said seat, a mounting providing a float lever pintle, a float lever oscillatable upon said pintle and provided with a float, a mounting providing a valve lever pintle, a valve lever oscillatable upon the valve lever pintle and provided with operative connections for valve actuation, a spring interposed between said levers and normally free of sufficient compression to unseat said valve, said second mentioned spring when compressed by the approach of the float lever toward the valve lever having sufficient bias to unseat said valve in opposition to its spring, arms connected with the said levers and having cam flanges disposed for interaction, the cam flange connected with the float lever having inner and outer arcuate surfaces substantially concentric with the pintle upon which the float lever oscillates, so disposed that in movement past the cam flange of the valve actuating lever the valve actuating lever will be restrained against oscillation until cleared by the cam flange of the float lever, the inner surface of said last mentioned cam flange being adapted to engage the cam flange of the valve lever during downward oscillation of the float lever until the compression of the second mentioned spring is sufficient to overcome the bias of the valve spring and thereupon to clear the valve actuating lever cam for the snap opening of the valve, the outer surface of the float lever cam being thereupon movable across the path of movement of the valve actuating lever cam until the bias of the second spring is so reduced as to be less than the bias of the valve spring and thereupon to clear the valve lever cam in the upward movement of the float lever to permit the snap closing of the valve.

4. In a snap action valve mechanism, the combination with a valve casing provided with a valve guiding bore and a valve seat, of a valve reciprocable in the bore to and from the seat, a compression spring biasing said valve toward its seat, a support projecting laterally from the casing and provided with a float lever pintle, a float lever oscillatable upon said pintle and provided with a float, a second support projecting from the valve casing beneath the support first mentioned and provided with a pintle, a valve lever oscillatable upon the second pintle in substantially the same plane of movement as the float lever and provided with operative connections for the actuation of said valve, a guide pin pivoted to one of said levers and loosely engaged in the other, a compression spring encircling the pin and interposed between said levers, said second mentioned spring being of such length as to have inadequate compression in the upper position of the float lever for the unseating of said valve, and to have sufficient compression in the lower position of the float lever to unseat the valve against the compression of the valve spring, arms connected with the respective levers, a cam part carried by the arm connected with the valve lever, a cam flange carried by the float lever arm and having inner and outer surfaces approximately concentric with the float lever pintle, said cam flange and cam part being adapted for interaction both in the upward and downward movements of the float lever to preclude movement of the valve lever responsive to the changes of relative bias of the respective springs until after such bias has become sufficiently great to actuate the valve with snap action in its respective directions of movement.

5. In a snap action valve, the combination with a valve casing having an inlet passage and provided with a bore in communication with an inclined with respect to said inlet passage and a valve port and seat aligned with the more, of a valve reciprocable in the bore to and from the seat, a closure at the upper end of the bore, a compression spring biasing said valve toward its seat, a support projecting laterally from the valve casing providing a float lever pintle, a float lever oscillatable about the pintle and provided with a float movable about the pintle between upper and lower positions, a second support projecting from the casing and provided with a valve lever pintle, a valve lever oscillatable about the valve lever pintle and provided with operative connections for the actuation of the valve, a spring guide interposed between said levers, a compression spring interposed between the levers and positioned by said guide, said second mentioned spring in the upper float position having less compression than the bias of said valve spring and in the lower float position having a compressive bias exceeding that of the valve spring, and cam means carried by the respective levers and positioned for interaction in all intermediate positions of the float lever to preclude movement of the valve actuating lever responsive to said differential bias save in the extreme positions of the float lever aforesaid.

6. In a snap action valve mechanism, the combination with a ported valve casing and a valve movable to and from the port, of an operating lever and a valve actuating lever, said operating lever having predetermined extreme positions at which valve response is desired, motion transmitting means between said levers including a compression spring, a second compression spring to the bias of which said valve actuating lever is subject, said second compression spring acting on the valve actuating lever in a direction corresponding to the direction of valve closing movement and the first compression spring operating on said lever in a direction of valve opening movement, the bias of the respective springs being such that the differential of bias therebetween is varied by said operating lever to effect a valve opening pressure in one extreme position of the valve operating lever and a closing pressure in the other extreme position thereof, and cam means carried by the respective levers and inter-engaging in all intermediate positions of the operating lever while providing clearance in the extreme positions thereof, said cam means precluding a response of the valve actuating lever to the spring differential until the operating lever reaches one or the other of its said extreme positions.

7. In a snap action valve mechanism, a snap action device for transmitting motion between a float and a valve, said device comprising a driving lever, a driven lever, a lost motion connection including energy storing means for transmitting motion from the driving lever to the driven lever, arms carried by the respective levers and comprising cam surfaces interacting in at least one direction of relative lost motion between said levers and comprising means for restraining response of the driven lever until sufficient energy is stored in said means for assuring the snap action movement of the driven lever upon the disengagement of said cam surfaces.

8. In a snap action valve mechanism, a device for the transmission of motion between an actuating member and a valve, said device comprising the combination with driving and driven members, the latter being provided with an operative valve unseating part, and means guiding said members for movement upon different paths, of lost motion driving connections from the driving member to the driven member including an energy storing spring, arms connected to the respective members and movable upon intersecting paths in the course of lost motion between the driving and driven members, said arms including mutually interacting cam surfaces engageable in the course of such lost motion to restrain the driven member from movement, said surfaces being mutually disengageable at a predetermined point in the course of such lost movement at which said spring has stored sufficient energy to assure the movement of the driven member in a valve unseating direction.

9. A snap action mechanism comprising the combination with driving and driven levers provided with separate pintles and oscillatable upon different paths, of means providing a bias against the movement of the driven lever in one direction, a compression spring interposed between said levers and having sufficient bias when compressed to move the driven lever in said direction against said biasing means, cam parts connected with the respective levers and engageable in operative relative directions of movement thereof, said cam parts being engageable in the approach of the driving lever to the driven lever to preclude movement of the driven lever until the operating lever reaches a predetermined position in which said spring has sufficient compression to overcome the bias to which the driven lever is subject and said cam parts being engageable in the reverse direction of movement of the driving lever to preclude movement of the driven lever in the direction of its bias until the bias of said spring is sufficiently lower than the bias to which the driven lever is subject so that the driven lever will snap in response to said biasing means when said cam means clear each other.

10. In a snap action mechanism, the combination with driving and driven levers provided with separate pivots upon which said levers are oscillatable upon different paths, a spring interposed between said levers and constituting lost motion, means for transmitting motion from one to the other, means loading the driven lever and adapted to be overcome by said spring when spring is sufficiently compressed, arms connected with said levers and having cam flanges disposed for interaction in the relative movement of said levers, the cam flange connected with the driving lever having inner and outer arcuate cam surfaces substantially concentric with the pivot upon which the driving lever oscillates and so disposed that in movement past the cam flange of the driven lever, said driven lever will be restrained against oscillation until cleared by the cam flange of the driving lever, the extent of said flanges being such that clearance therebetween does not occur until the compression of said spring is adequate to overcome the load to which the driven lever is subject.

11. The device of claim 10 in which the outer surface of the driving lever cam flange is movable across the path of movement of the driven lever cam flange in operative restraining relation thereto for a distance such that the driven lever is restrained against movement in response to the load imposed thereon until the bias of said spring is so reduced as to be less effective upon the driven lever than said load, whereby said driven lever will move under its load with snap action when said flanges clear in the return relative movement of said levers.

JACOB C. MILLER.

CERTIFICATE OF CORRECTION.

Patent No. 2,296,219.

September 15, 1942.

JACOB C. MILLER.

It is hereby certified that error appears in the printed specification of the above numbered patent requiring correction as follows: Page 3, first column, line 22, claim 5, for "an inclined" read --and inclined--; line 23, same claim, for "more" read --bore--; and second column, line 70, claim 10, after "when" insert --said--; and that the said Letters Patent should be read with this correction therein that the same may conform to the record of the case in the Patent Office.

Signed and sealed this 20th day of October, A. D. 1942.

Henry Van Arsdale,
Acting Commissioner of Patents.

(Seal)